May 27, 1958     C. A. HOLMBERG     2,836,139

UNIVERSALLY ADJUSTABLE TWIN CLAMPING MEANS

Filed May 14, 1956

CARL ALBIN HOLMBERG
*INVENTOR.*

BY *Smith & Tuck*

United States Patent Office 2,836,139
Patented May 27, 1958

2,836,139
UNIVERSALLY ADJUSTABLE TWIN CLAMPING MEANS

Carl A. Holmberg, Bellevue, Wash.

Application May 14, 1956, Serial No. 584,510

1 Claim. (Cl. 113—104)

My present invention relates to the general art of clamping devices, and more particularly to an arrangement whereby two hand vises or vise type pliers may be joined together with such flexibility in the coupling means that various items may be held in a wide range of positions. These are provided so that the two units, which may be positioned without reference to each other as far as their longitudinal axis and items held in their jaws are concerned, but which may be brought into adjusted position and held in that position during any other operations which may be necessary, such as welding or brazing or fitting other items to the two units which are held in adjusted relationship to each other.

In the past many forms of clamping and positioning devices have been provided of a small scale so that they can be easily hand-held. However, when it is desirable to hold two items in a fixed relationship to each other while a continued operation is being performed, such as welding, brazing or soldering them together or attaching other units to the two pieces as by soldering or welding or the like, then it becomes evident that, with the average equipment, it is far beyond the capabilities of any single individual. With my present dual clamping means it is possible for me to employ, for example, two of the very desirable vise type pliers, which are available in many different styles but which have the capacity of serving as a vise, in that they can grip units and will through toggle action or otherwise retain the gripping action applied to them by locking means after the applied force has been removed. For certain operations, such as handling two small flat members, one such arrangement can quite often be employed to hold the two pieces together. However, if it becomes desirable, for instance, to join by welding or otherwise an item of flat stock and an item of round stock together, then it is necessary to employ a second pair of vise type pliers, and then it becomes clear that the operator cannot hold the different items in an adjusted position while he holds the solder or welding rod and the necessary heat-applying elements as well. In this present invention I have provided means so that the two parts that are to be joined together can each be individually gripped in a jaw arrangement adapted to the thickness presented by the items and then, after they have been clamped in their respective pliers, the pliers themselves can be brought into an adjusted coacting position. This arrangement permits the two elements held in the jaws of the separate pliers to be accurately positioned with respect to each other, and then the pliers may be laid down on any surface or supported from any additional clamping means desired, and the workman will then have both hands available for the welding, soldering, brazing or fabrication operation.

It is therefore a principal object of this present invention to provide means so that a plurality of hand tools providing locking and gripping jaws may be each of them applied to a piece of work, and then the gripping elements may be brought into an adjusted position so that the items held by the different pliers will be in a fixed relationship to each other to facilitate joining them together by any of the various means employed normally in industry.

A further object of my invention is to provide means whereby tools that may normally be principally used as independent tools may be conveniently joined together so that a plurality of elements may be accurately positioned by them and wherein the positioning and clamping means for the holding elements are simple constructions and very simple to use.

A further object of this present invention is to provide a clamping and adjustable positioning means for gripping tools, which means is provided with a single tensioning means for holding the tools in a desired adjusted position, and wherein means are provided to assure that the means will be easily handled as a unit before being clamped and during the clamping operation can only be tightened to a predetermined amount so that no permanent injury or distortion can be effected by carelessly operating the tensioning means.

Further objects, advantages and capabilities will be apparent from the description and disclosure in the drawings, or may be comprehended or are inherent in the device.

Figure 1:
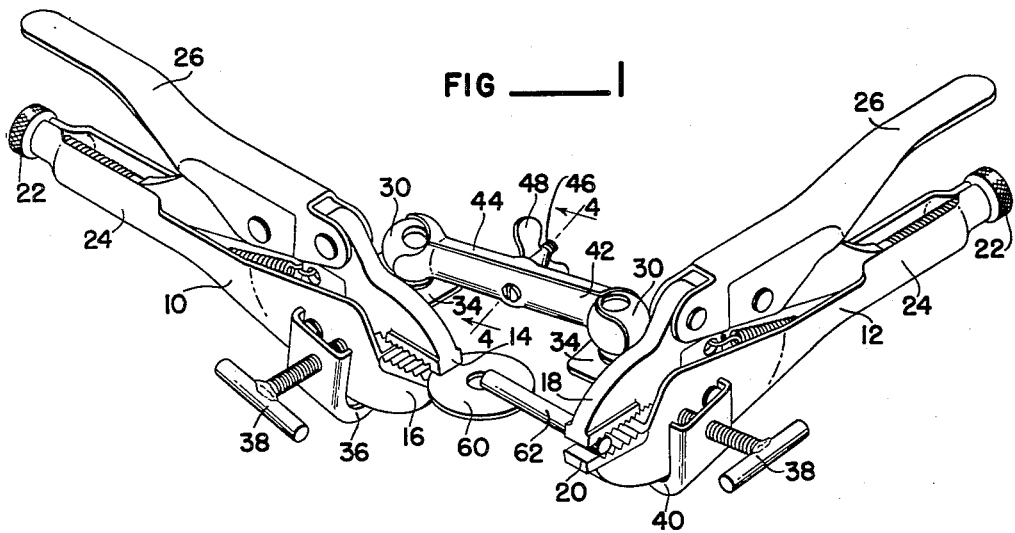
Figure 1 is a perspective view showing one preferred use of my equipment.

Referring more particularly to the disclosure in the drawings, the numerals 10 and 12 indicate a common type of vise grip pliers, and these tools have been selected as appropriate for a specific example of the employment of my specific clamping means. It will be apparent, it is believed, that various forms of clamping devices of the hand-held type might be substituted for this equipment. Each of these pliers are provided with coacting jaws as 14 and 16 and 18 and 20. Means are provided in this instance by a thumbscrew arrangement at 22 so that the coacting jaws will meet on the object being held within the range of the toggle mechanism, which will insure the clamping of the work and the holding of it in a clamped position when the two handles as 24 and 26 are brought together.

I provide a universal clamping means in which I employ preferably a hollow ball-like clamp base 30 for each of the coacting clamping units as, for instance, the pliers 10 or 12. The base units 30 are secured as by machine screws 32 to a laterally disposed member 34 which is part of a U-shaped clamp 36. These U-shaped clamp members are each adapted to partially encircle one of the clamping units as, for instance, the tools 10 or 12, so that a clamping screw as 38 may be employed to hold the tool within the confines of the U-shaped clamp and thus provide a very secure clamping arrangement for the tool itself. There is of course one such U-shaped clamp member for each of the tools. These are probably most clearly illustrated in Figure 2, in which I have illustrated the U-shaped clamp member 36 for tool 10 and the U-shaped clamp member 40 for the coacting clamping tool 12.

Figure 3:
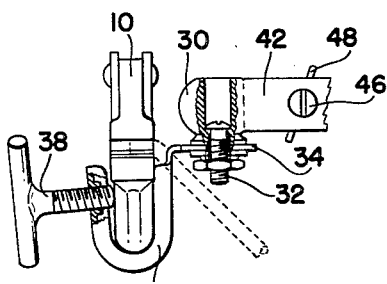
Figure 3 is a view partly in section showing the construction of the left hand unit of Figure 2.

The clamp base units 30 are partially spherical elements more properly designated as spherical zones and are provided with a clamp means consisting of the two symmetrical and resilient clamp members 42 and 44. These members are held together by the tensioning screw 46 with preferably a quick acting nut as the wing nut 48 to increase or decrease the tension in accordance with whether the work is to be locked or whether it is to be released, so that angular changes may be made in the settings. Members 42 and 44 are preferably formed as metal stampings and are made symmetrical, but the opposite ends cover a different area on the spherical surfaces, and in the working arrangement the members 42 and 44 are reversed so that each spherical clamp base unit 30 has a large cupped member and a small one provided by the members 42 and 44. This arrangement adds materially to the range of adjustment possible with the equipment. It will be noted in Figure 3 that the spherical elements 30 are preferably counterbored axially so that the securing screw 32 can make a fixed connection with the bar 34 with a minimum of displacement of the assembled parts. This is desirable in that it permits a wider range of adjustment of the tools in use and, further, reduces the leverage of the tools against each other and permits a given pressure, to give a more secure clamping arrangement.

Figure 4:
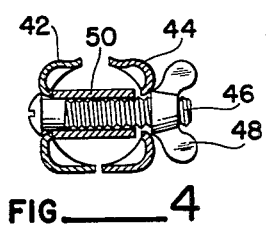
Figure 4 is a cross-sectional view along the line 4—4 of Figure 1 and shows one form of tension limiting means for the multiple clamp unit.

Referring to Figure 4, it will be noted that screw 46, which passes through members 42 and 44, has disposed around it a tubular stop member 50. The purpose of this member is to limit the amount of movement of the wing nut 48 and in this manner prevent undue distortion of members 42 and 44, it being desirable that these members be resilient so as to give continued spring action on the spherical base members 30, and this desirable action may be destroyed by careless handling if it is possible to run nut 48 down too far on screw 46. The tubular stop member adequately provides against this possible misuse of the equipment.

Figure 2:
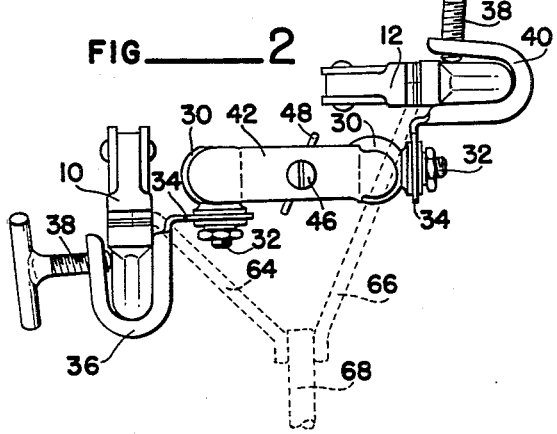
Figure 2 is an end elevation showing two vise grip pliers disposed in parallel relationship to each other and wherein a different operation is indicated.

Figures 1 and 2 illustrate two different modes of using my equipment. In Figure 1 the plier member 10 has a washer as 60 gripped in its jaws, and tool 12 has a round rod as 62 gripped. Now, it was possible for the operator to place rod 62 in almost any conceivable relationship with washer 60. It might be as shown in Figure 1 or rod 62 might be disposed at right angles to the plane of washer 60 and might be disposed at the periphery of the same or axially with the same or at any intermediate point. The universal action of the two ball joints as illustrated gives the user an almost unlimited variety of adjusted positions.

In Figure 2 the members held in the respective pliers 10 and 12 are irregular in shape, as illustrated at 64 and 66, yet they may be positioned, at the workman's option, with respect to member 68. When the adjusted position is secured, the tools can then be put on any satisfactory support and the user will have both hands available for any fabrication operation such as welding or the like. It is to be understood, of course, that in the present drawings and specification a very simplified form of the structure has been employed. There is, of course, no practical limit on the number of tools 10 and 12 which might be employed. However, it has not been deemed necessary or even desirable to illustrate them, as their functioning will be of the same order as that illustrated and described as a typical example.

It is believed that it will be clearly apparent from the above description and the disclosure in the drawings that the invention comprehends a novel construction of clamping devices.

Having thus disclosed the invention, I claim:

A universally adjustable multiple clamping means, comprising: a plurality of self-locking clamping devices of the type adapted to be held in a workman's hand, U-shaped clamps adapted to engage said clamping devices within the U-shaped opening provided in fixed clamping relationship, a laterally projecting arm formed as part of each of said U-shaped clamps, a spherical clamping member in the form of a spherical zone fixedly secured to each of said arms, coacting and resilient clamp bars having a cup of different sizes at each end adapted to cover only a portion of said spherical zone of each clamp, said clamp bars of identical construction but employed in a reversed disposition placing a small and a large cup in contact with the same spherical zone, a tensioning element disposed intermediate the ends of said clamp bars, and stop means serving to limit the application of tension that may be applied to said clamp bars.

References Cited in the file of this patent

UNITED STATES PATENTS

| 574,529 | Elliott | Jan. 5, 1897 |
| 1,323,127 | Treuthardt | Nov. 25, 1919 |
| 2,496,308 | Pugh | Feb. 7, 1950 |
| 2,642,766 | Elsberg | June 23, 1953 |
| 2,669,958 | Sweeney | Feb. 23, 1954 |

FOREIGN PATENTS

| 8,150 | Great Britain | Nov. 22, 1906 |